(12) United States Patent
Moore

(10) Patent No.: US 7,743,675 B2
(45) Date of Patent: Jun. 29, 2010

(54) APPARATUS FOR IMPACT TESTING FOR ELECTRIC GENERATOR STATOR WEDGE TIGHTNESS

(75) Inventor: Charles C. Moore, Hibbs, PA (US)

(73) Assignee: Siemens Energy, Inc., Orlando, FL (US)

( * ) Notice: Subject to any disclaimer, the term of this patent is extended or adjusted under 35 U.S.C. 154(b) by 57 days.

(21) Appl. No.: 12/132,697

(22) Filed: Jun. 4, 2008

(65) Prior Publication Data

US 2009/0301168 A1 Dec. 10, 2009

(51) Int. Cl.
*G01M 7/00* (2006.01)
*G01M 19/00* (2006.01)
*B62D 55/00* (2006.01)

(52) U.S. Cl. ............. 73/865.8; 73/12.09; 73/12.12; 180/9.21; 180/9.48

(58) Field of Classification Search ............... 73/12.09, 73/12.12, 865.8; 180/9.21, 9.48
See application file for complete search history.

(56) References Cited

U.S. PATENT DOCUMENTS

| | | | | | |
|---|---|---|---|---|---|
| 3,279,323 | A | * | 10/1966 | Asche | 91/20 |
| 4,803,563 | A | | 2/1989 | Dailey et al. | |
| 4,889,000 | A | | 12/1989 | Jaafar et al. | |
| 4,962,660 | A | * | 10/1990 | Dailey et al. | 73/12.09 |
| 5,012,684 | A | * | 5/1991 | Humphries | 73/865.8 |
| 5,164,826 | A | * | 11/1992 | Dailey | 348/83 |
| 5,295,388 | A | * | 3/1994 | Fischer et al. | 73/12.09 |
| 5,365,166 | A | * | 11/1994 | Dailey et al. | 324/158.1 |
| 5,473,953 | A | * | 12/1995 | Appel | 73/866.5 |
| 5,493,894 | A | * | 2/1996 | Dailey et al. | 73/12.09 |
| 5,557,216 | A | * | 9/1996 | Dailey et al. | 324/772 |
| 5,650,579 | A | * | 7/1997 | Hatley et al. | 73/865.8 |
| 6,069,473 | A | * | 5/2000 | Hatley | 324/207.18 |
| 6,100,711 | A | * | 8/2000 | Hatley | 324/772 |
| 6,672,413 | B2 | * | 1/2004 | Moore et al. | 180/9.21 |
| 6,791,351 | B2 | * | 9/2004 | Fischer et al. | 324/772 |
| 6,814,169 | B2 | * | 11/2004 | Moore et al. | 180/9.21 |
| 6,876,222 | B2 | * | 4/2005 | Fischer et al. | 324/772 |
| 6,889,783 | B1 | * | 5/2005 | Moore et al. | 180/9.21 |
| 6,943,470 | B2 | * | 9/2005 | Rowe et al. | 310/58 |
| 7,017,468 | B2 | * | 3/2006 | Steffen | 91/41 |
| 7,075,296 | B2 | * | 7/2006 | Moore | 324/262 |
| 7,201,055 | B1 | * | 4/2007 | Bagley et al. | 73/618 |
| 7,343,828 | B2 | * | 3/2008 | Bagley et al. | 73/865.8 |
| 7,418,858 | B2 | * | 9/2008 | Fischer et al. | 73/161 |
| 7,520,189 | B2 | * | 4/2009 | Abbasi et al. | 73/865.9 |
| 7,555,966 | B2 | * | 7/2009 | Bagley et al. | 73/865.8 |
| 2005/0116555 | A1 | * | 6/2005 | Rowe et al. | 310/58 |
| 2007/0089544 | A1 | * | 4/2007 | Bagley et al. | 73/865.8 |
| 2007/0277629 | A1 | * | 12/2007 | Bagley et al. | 73/865.8 |
| 2007/0277630 | A1 | * | 12/2007 | Bagley et al. | 73/865.9 |
| 2008/0087112 | A1 | * | 4/2008 | Bagley et al. | 73/865.8 |
| 2008/0087113 | A1 | * | 4/2008 | Bagley et al. | 73/865.8 |
| 2008/0098832 | A1 | * | 5/2008 | Abbasi et al. | 73/865.9 |

* cited by examiner

Primary Examiner—Lisa M Caputo
Assistant Examiner—Jonathan Dunlap

(57) ABSTRACT

A remote-controlled dynamoelectric machine inspection vehicle that can fit and travel within a narrow air gap between a stator and rotor of a dynamoelectric machine. The inspection vehicle has an effectuator that can remotely activate a hammer driven by a high pressure pneumatic three-stage miniature piston that propels the hammer against a stator slot wedge creating an impact force that causes the wedge to vibrate. The vibrations are sensed to determine the tightness of the wedge.

12 Claims, 6 Drawing Sheets

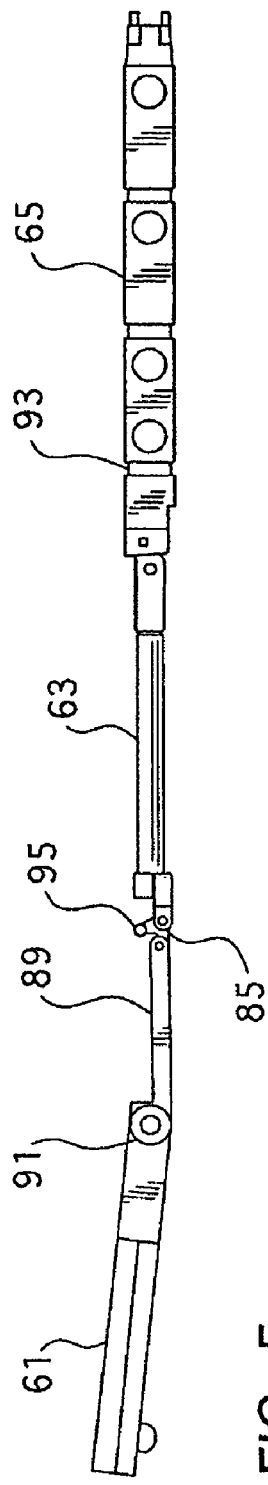
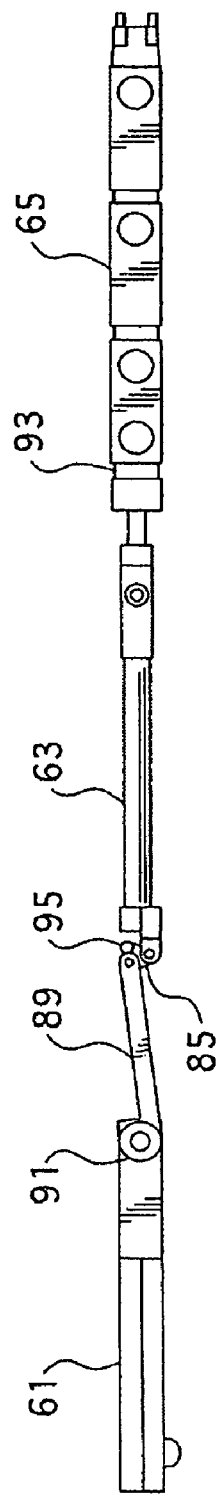
FIG. 5
FIG. 6

APPARATUS FOR IMPACT TESTING FOR ELECTRIC GENERATOR STATOR WEDGE TIGHTNESS

BACKGROUND OF THE INVENTION

1. Field of the Invention

This invention relates to apparatus for remotely testing dynamoelectric machine stator wedge tightness with the rotor in place. More particularly, this invention relates to apparatus which includes a remotely controlled carriage small enough to fit into the air gap between the rotor and stator of a dynamoelectric machine, which carries an impactor to induce vibrations in the wedges which are measured by a sensor to provide information on wedge tightness.

2. Description of the Prior Art

During scheduled and some forced outages of dynamoelectric machines, such as electric utility steam driven electric generators, one of the major concerns is the condition of the stator coils. Many tests are performed to quantify stator integrity. In the past, the most time consuming of these tests has been the test of stator wedge tightness since, originally, it has required removal of the rotor to gain access to the stator bore area, specifically the tooth tip area where the wedges are located. Removal of the rotor requires two to three days alone. The accepted industry method of testing stator wedge tightness is to "tap" the wedge, feel the resulting vibration, and listen to the sound. A loose wedge will vibrate more than a tight one, and can be felt with the fingers. In addition, a loose wedge will emit a characteristic hollow sound, which the experienced technician quickly learns to recognize as a loose wedge.

It is very important that wedge tightness be carefully ascertained and corrected if deficient because the tightness of the stator wedge is the only structural element that prevents stator coil vibration due to the combined effects of magnetic and mechanical loading. Field experience has shown that failure to hold the stator coil stationary in the stator slot permits ever increasing levels of vibration leading to deterioration and finally failure of the stator mica insulation and, in many instances, grounding or "flashover" of the coils. When this occurs, the owner/operator of the unit is faced with a time-consuming and expensive rewinding process. For these reasons, stator wedge tightness is of interest during routine outages, and not just when the rotor is removed.

One of the difficulties in testing wedge tightness without removal of the rotor is that there is as little as between 0.6 inch (1.52 cm) and 1.5 inches (3.81 cm) of clearance between the stator bore and the rotor retainer ring through which apparatus may be inserted to inspect the wedges distributed along the length of the stator. Another difficulty is that the wedges are made of non-conducive, non-magnetically permeable material such as, for example, fiberglass coated with Kevlar which is, compared to other materials such as steel, an absorbent of mechanical energy so that the techniques available for measuring tightness are limited. An additional difficulty, especially in the case of an impact tester, is that the stator coils extend radially outward about a horizontal axis such that the effect of gravity on the impactor varies with the angular position of the stator wedge being tested.

Commonly owned U.S. Pat. No. 4,889,000 discloses a low profile remotely controlled carriage for insertion into the gap between the rotor and stator of a dynamoelectric machine such as an electric generator for performing inspections. The carriage is positioned over a wedge with the aid of a miniaturized television camera. A solenoid when energized strikes the wedge and a microphone records the acoustic response. It has been found, however, that it is desirable to apply a larger and more repeatable impact force to the wedge than can be developed by a solenoid. It has also been found that it is difficult to assess with a computer the acoustic response recorded by the microphone.

The inspection apparatus of U.S. Pat. No. 4,889,000 issued Dec. 26, 1989, also includes an eddy current tester which is used to assess the condition of the insulation between the stator laminations. Commonly owned U.S. Pat. No. 4,803,563 also discloses an eddy current tester mounted on a carriage inserted between the rotor and stator of an electric generator for inspecting the insulation between the stator laminations. The carriage in U.S. Pat. No. 4,803,563 is held in place against the stator by permanent magnets embedded in the carriage chassis.

Other attempts have been made to quantify the "tap, listen and feel" process for testing stator wedge tightness. A mechanical impedance probe has been developed which is based upon the recognition that during a resonance sweep, a tight wedge will resonate (shift phase) at a slightly higher frequency than a loose one. This method does not discriminate between different degrees of looseness nor does the apparatus have sufficient power to resonate wedges of the size and style used with the larger steam driven units. In addition, the unit is too large to fit into the rotor stator gap.

Another type of apparatus for measuring wedge tightness uses a force measurement system. The theory of operation is that when an impact force is applied to a stator wedge, the hammer will maintain contact with a loose wedge for a longer interval before recoiling than with the same wedge in a tight condition. This has been confirmed, however, the sensitivity of the test does not permit clear discrimination between the tight and loose conditions. Furthermore, a version of such a device small enough for use in the air gap of a generator has not been developed.

Commonly owned U.S. Pat. Nos. 4,962,660 and 5,295,388 describe a low profile remotely controlled carriage which is inserted between the rotor and stator of an electric generator and carries an impactor which can be preloaded to strike the stator wedges in all orientations around the stator with a selected high impact force which causes the stator wedge to vibrate. An eddy current coil is employed to sense the vibration. The impact is imparted by a motor driven spring and cable system. The motor is used to load and cock the spring. An encoder on the motor counts the revolutions made while loading the spring to identify when the hammer is cocked and ready to be released under the force of the spring. The cable that connects the spring to the hammer on the existing system would typically fail at least once per inspection and sometimes two or three times. Each time there was a failure of the cable, the carriage would need to be removed from the generator and repaired. This repair would typically take two to three hours to complete with an hour for the carriage removal and another hour for reinstallation. Furthermore, the size of the system would not permit the current carriage to fit into gaps of less than 0.75 inch (1.90 cm). Furthermore, it is desirable to improve the cycle time of such a system.

Accordingly, a new wedge tightness tester is desired that can fit within the air gaps of dynamoelectric machines having air gaps in the order of 0.60 inches (1.52 cm) or larger. Furthermore, a new wedge tightness tester is desired that has an improved cycle time and enhanced reliability.

SUMMARY OF THE INVENTION

The present invention is a remote-controlled maintenance vehicle for testing the tightness of wedges in a coil slot of a dynamoelectric machine, that can travel and is operable within the air gap of a generator between the rotor and stator. Thus, employing the remote-controlled maintenance vehicle of this invention, slot wedges of a dynamoelectric machine such as a generator or a motor may be tested for tightness without removing the rotor. While this invention is described in an application to generators, it should be appreciated that it can be applied equally as well to large motors.

The maintenance vehicle of the present invention includes a frame and at least one drive module attached to the frame and having a drive train that utilizes magnetic adhesion to traverse an interior ferromagnetic surface of the dynamoelectric machine. A motor is operatively connected to the drive module and responsive to a signal from a remote controller to provide a motor force to the drive train. An effectuator is attached to the frame. The effectuator is driven by a multi-stage pneumatic or a hydraulic piston and cylinder assembly wherein the pneumatic or hydraulic working fluid is supplied under pressure in parallel to each stage to activate the piston to drive an impact head to strike a wedge in a coil slot in a stator of a dynamoelectric machine. The dynamoelectric machine maintenance vehicle is sized and configured to fit in an air gap between the stator and the rotor of the dynamoelectric machine. Preferably, the maintenance vehicle is sized and configured to fit in an air gap as small as 0.6 inches (1.52 cm).

In one preferred embodiment the dynamoelectric machine vehicles piston and cylinder assembly is a pneumatic assembly having a working gas delivered to the cylinder at between 100 psi ($kg/cm^2$) and 450 psi (31.64 $kg/cm^2$). Preferably, the working gas is delivered at a pressure of between 300 psi (21.09 $kg/cm^2$) and 400 psi (28.12 $kg/cm^2$).

In one embodiment the frame has an elongated axial dimension and the piston reciprocates in a direction parallel to the axis of the frame and drives an impact head that strikes the wedge in a direction substantially orthogonal to the axis of the frame. Desirably, the impact head has a handle with a peripheral end and a pivot spaced from the peripheral end. The peripheral end is connected to a first attachment point on a cam and the piston is connected to a second attachment point on the cam spaced from the first attachment point. The piston exerts a force on the cam that cocks the cam to rotate and drive the peripheral end of the impact head handle in a direction that causes the impact head to strike the wedge when a latch restraining the impact head is released. A spring, wedged between the impact head handle and a cover on the vehicle frame, returns the impact head and piston to a retracted position when the working fluid pressure on the piston is released. Desirably, the multi-stage piston and cylinder assembly has at least three stages with each stage being simultaneously supplied with a working gas from miniature compressed gas bottles that are supported on the frame or alternately from a remote gas source which is connected to the vehicle with a supply hose. In one embodiment the working gas is compressed within the gas bottles to a pressure of approximately 4,500 psi (316.38 $kg/cm^2$). In the preferred embodiment the piston and cylinder assembly has an 8 mm (0.31 inch) bore diameter. Preferably, the impact head develops an impact force of 300 to 400 psi (21.09-28.12 $kg/cm^2$).

BRIEF DESCRIPTION OF THE DRAWINGS

For a better understanding of the invention, reference may be made to the preferred embodiments exemplary of the invention, shown in the accompanying drawings in which:

FIG. 5 is a side view of the effectuator drive system shown in FIG. 4 with the impact head shown in a withdrawn position;

FIG. 6 is the effectuator drive system shown in FIG. 5 with the piston fully extended and the impact head in a striking position.

DESCRIPTION OF THE PREFERRED EMBODIMENTS

Figure 1:
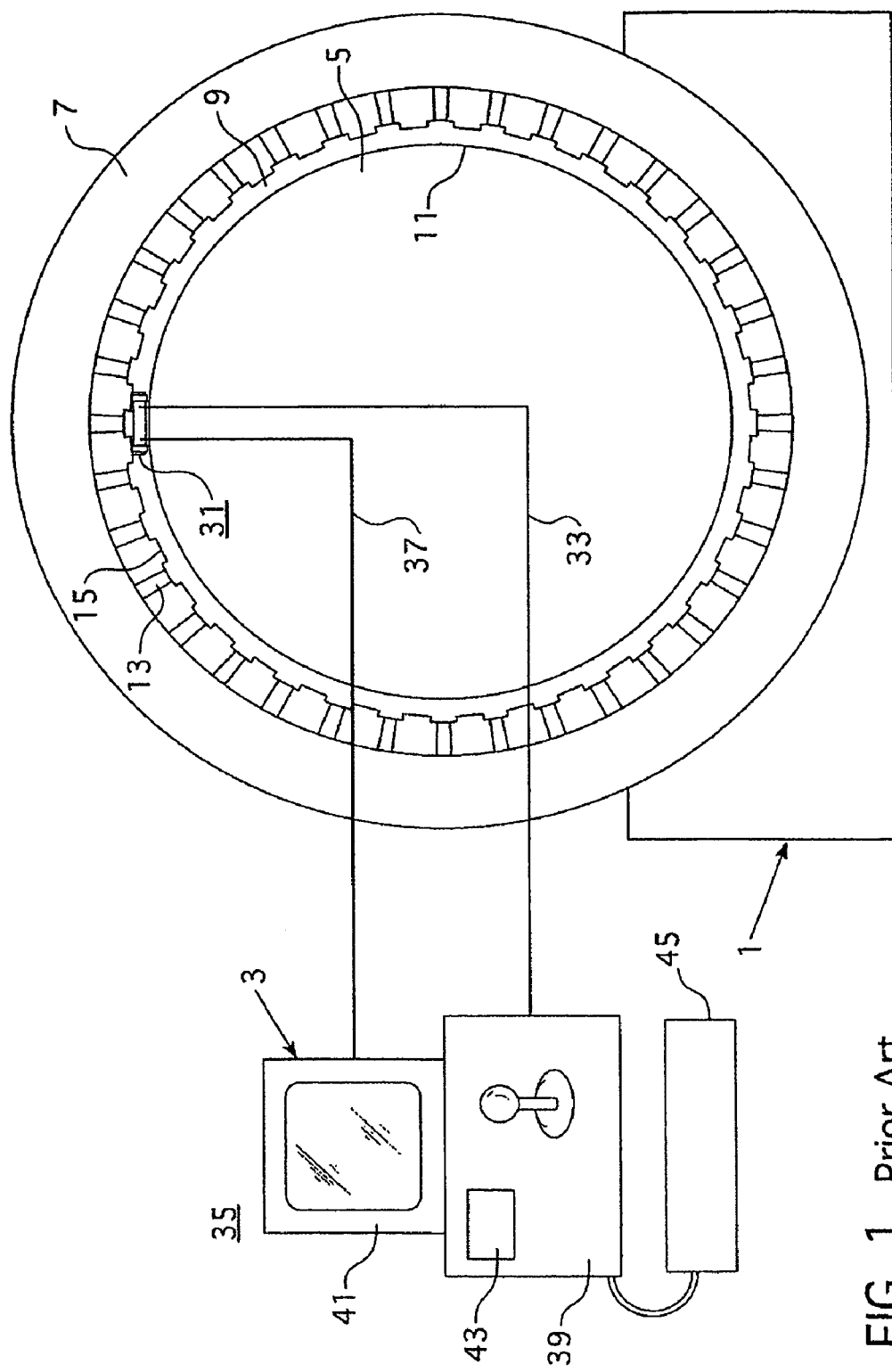
FIG. 1 is a schematic view of an electric generator with the inspection system of the invention in place to perform an inspection of generator stator wedge tightness.

FIG. 1 schematically illustrates a large steam turbine driven electric power generator 1 with the inspection system 3 of the invention in place for measuring generator stator wedge tightness. The generator 1 includes a rotor 5 mounted for rotation within a stator 7. A narrow air gap 9 is formed between the rotor retainer ring 11 and the stator. In some electric generators, this gap 9 can be as narrow as 0.6 inches (1.52 cm). The stator 7 includes stator coils 13 positioned between longitudinally extending stator teeth 15.

Figure 2:
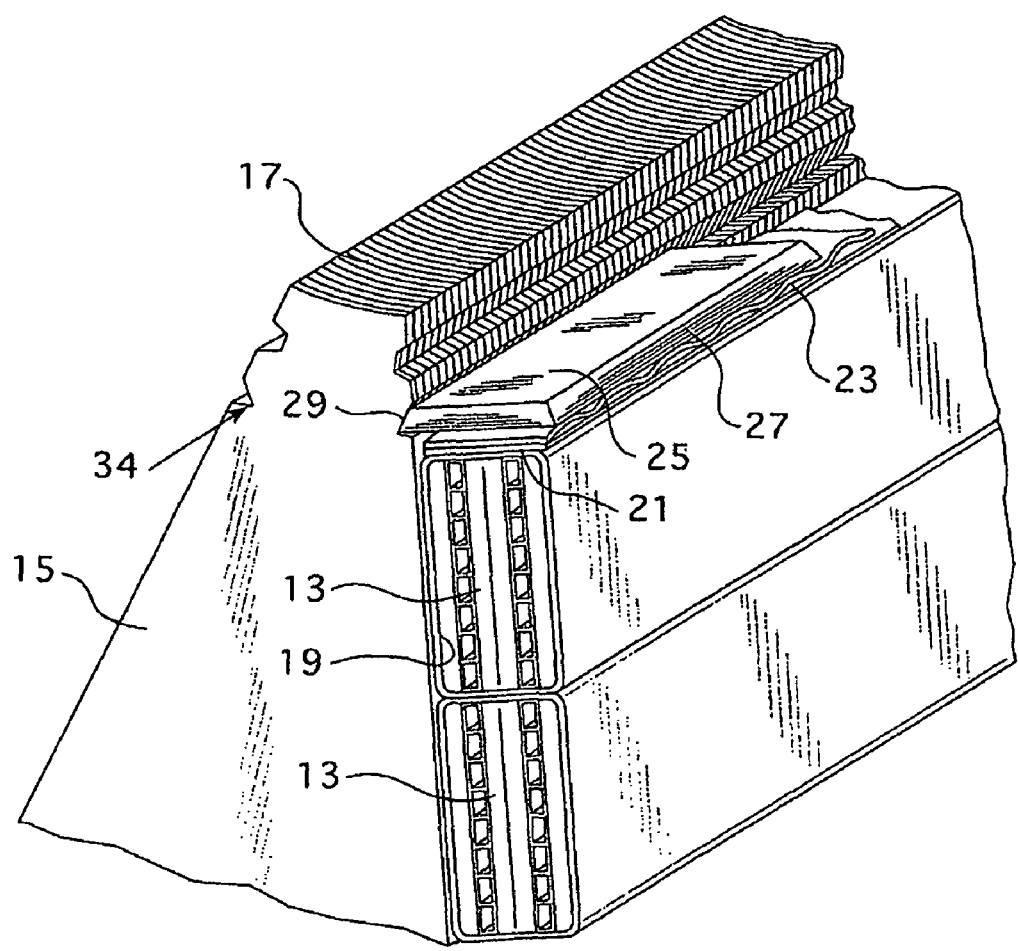
FIG. 2 is a fragmentary isometric view of the portion of the stator of the electric generator of FIG. 1 illustrating the manner in which the stator coil is held in place.

As shown more clearly in FIG. 2, the stator teeth 15 which are made of laminations 17 form stator slots 19 in which stator coils 13 are stacked in pairs, one on top of the other. The stator coils 13 are retained in the slots 19 by shims 21, sections of ripple springs 23, and stator wedges 25 having beveled edges 27 which engage correspondingly shaped grooves 29 in the sidewalls of the stator teeth 15. The ripple spring sections 23 are compressed between the stator wedges and shims 21 to generate a force which firmly holds the coils in place. Over time, the ripple springs can lose their resiliency so that the wedges become loose. As previously mentioned, this permits the coils 13 to vibrate which can result in damage to the coil and eventually failure of the coil insulation. The present invention inspects stator wedge tightness so that corrective action can be taken before this occurs.

Returning to FIG. 1, the inspection system 3 of the invention includes a low profile vehicle 31 which is inserted in the narrow air gap 9 between the rotor and stator and travels along the stator slot inspecting the wedges for tightness. As will be seen, the low profile main vehicle 31 carries an impactor effectuator which sets up vibrations in the stator wedges and a detector which generates electric signals in response to those vibrations. The low profile vehicle 31 also carries a miniature television camera which the operator can use to successively position the low profile main carriage 103 of the vehicle 31 over the successive stator wedges in the slot and by which the operator can monitor operation of the impactor. Electrical signals to and from the low profile main carriage to control positioning of the carriage and operation of the impactor and the detector, and data signals from the detector are carried by an electrical cable 33 connected between the low profile main carriage 31 and a console 35. Similarly, control and video signals to and from the video camera are carried between the main carriage and the console by cable 37. The cable 33 is connected to an electronic control box 39 while the cable 37 carrying the video signals is connected to a monitor 41. The electronic control box 39 includes a display 43 and a key pad 45 through which the operator can interface with and control the inspection system. The monitor 41 permits the operator to position the main carriage 31 over a selected stator wedge and to observe operation of the impactor.

Figure 3:
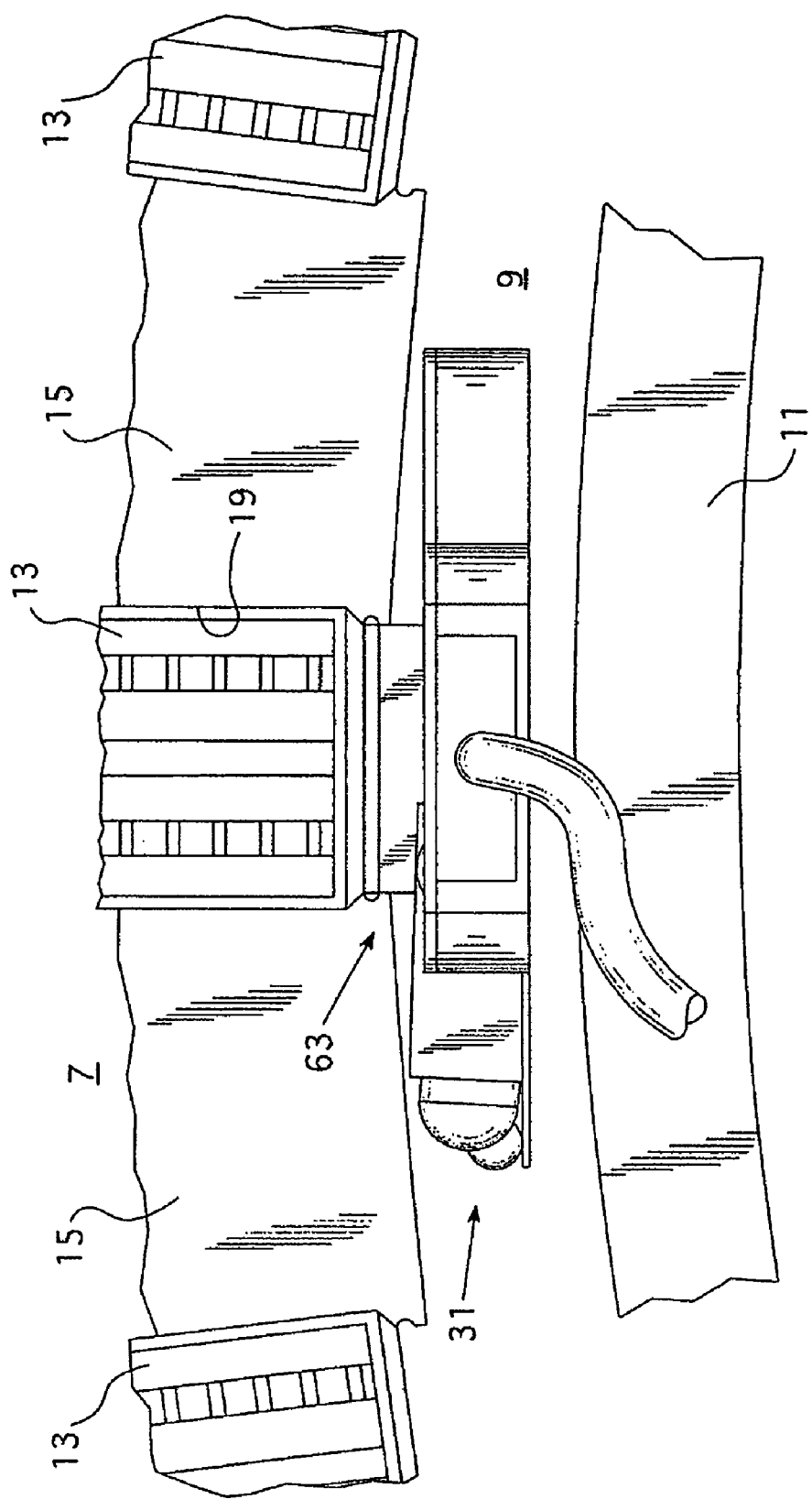
FIG. 3 is a rear view of the low profile vehicle of the inspection system of the invention shown in place within the electric generator of FIG. 1.
Figure 4:
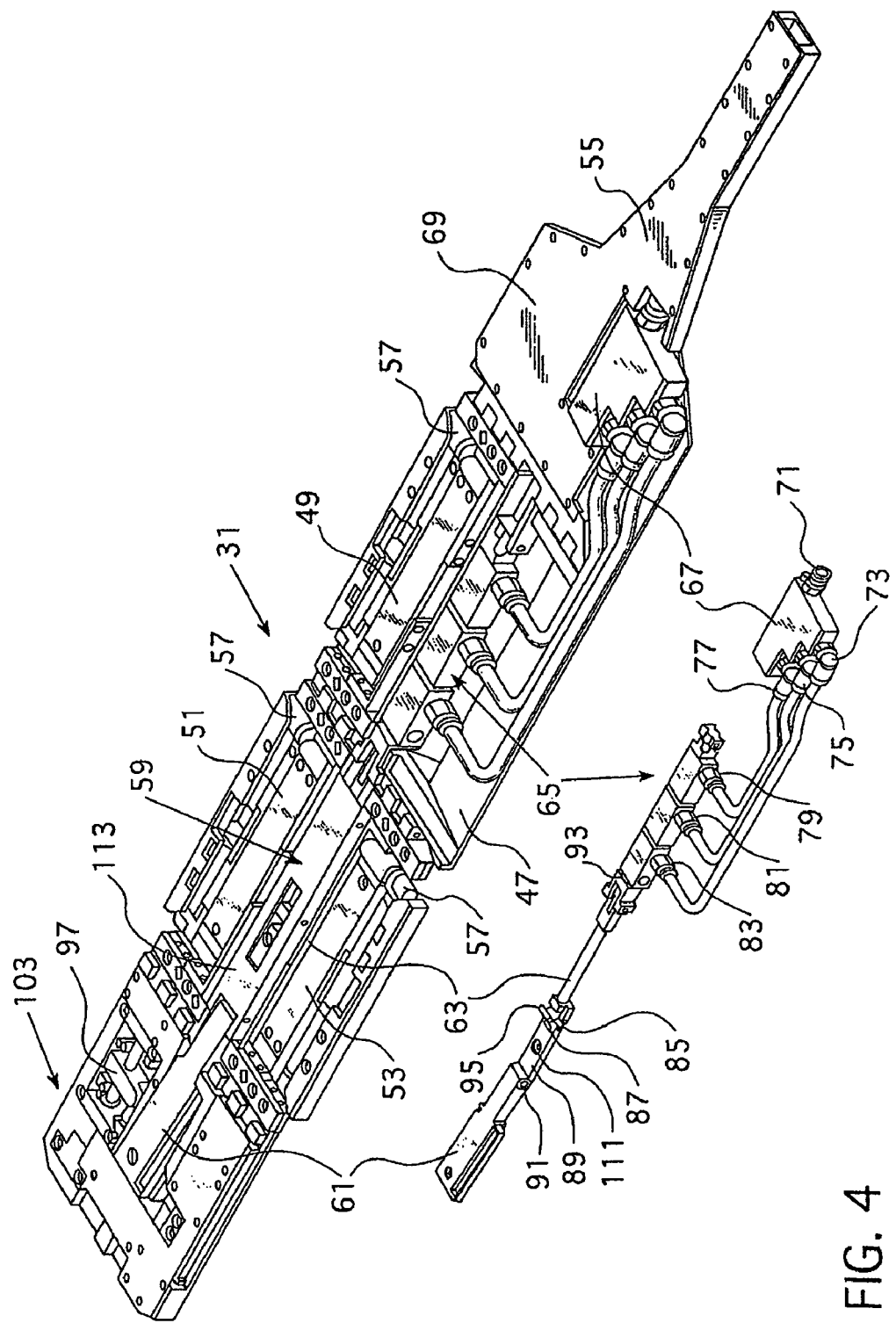
FIG. 4 is a perspective view of the low profile vehicle of the invention with the effectuator shown separated out for clarity.

Referring to FIGS. 3 and 4, the low profile vehicle 31 has a chassis 47 made of a non-electrically conductive, nonmagnetically permeable material such a fiberglass. Three motorized track drive assemblies 49, 51 and 53 drive the carriage and a "tail" section 55 manages the electrical cables and is used as a handle for insertion and removal of the vehicle 31 in and out of the generator air gap 9. Though the vehicle 31 is shown and described as applied to a generator, it should be appreciated that it can be used in any large dynamoelectric machine that employs wedges that can have the wedge tightness tested in place. The track drives 49, 51 and 53 each have an endless textured or treaded belt which extends around sprockets at either end of the drive with one of the sprockets on each of the track drives being driven by an electric motor 57 mounted on the chassis 47. An encoder (not shown) also driven by the motor 57 provides signals representing carriage movement to the electronic control box 39 for determining the position of the carriage. A number of one half inch diameter and one inch diameter neodymium magnets are distributed over the chassis 47. These magnets secure the main carriage to the stator for all locations of the stator slots around the interior of the stator. Guides 63 mounted on the bottom of the chassis 47 engage the stator slot 19 as seen in FIG. 3 to direct the vehicle 31 along a selected slot. As described to this point, the main carriage 31 is similar to that described in U.S. Pat. No. 6,889,783, issued May 10, 2005 to the assignee of this invention.

The carriage 31 carries an effectuator 59 which is made up of an impactor or hammer 61, connecting linkage 63, a three-stage piston and cylinder assembly 65, a gas or hydraulic manifold 67, and compressed gas or fluid bottles which are stored under the tail cover 69 for supplying gas or alternately a hydraulic fluid to the manifold 57. Alternately, gas or hydraulic lines can extend out through the tail section 55 to an external supply system. The effectuator is shown broken away at the bottom of FIG. 4 for clarity. Gas is supplied from the gas bottles to the inlet 71 of the manifold 67. The manifold 67 then feeds three manifold outlets 73, 75 and 77 which are respectively connected to the inlets 79, 81 and 83 of a three-stage piston/cylinder assembly 65. The piston 93 of the piston/cylinder assembly 65 is connected by a linkage 63 to one side of a cam 85. The cam 85 rotates around a pivot point 95. An opposite side of the cam, spaced from the attachment point of the linkage 63, is connected to the peripheral end 87 of the handle 89 of the hammer 61. The hammer handle 89 has a pivot point 91 that causes the head of the hammer 61 to raise and lower as the cam 85 is rotated by the withdrawal and extension of the piston 93. The working fluid is fed through each of the inlet stages 79, 81 and 83 of the three-stage piston/cylinder assembly 65 simultaneously under pressures between 100 and 450 psi (7.03-31.64 kg/cm$^2$), which provides a large force on the cam 85 in a direction that will move the hammer 61 to strike the wedge with a force approximately between 300-400 psi (21.09-28.12 kg/cm$^2$) with an 8 mm (0.31 inch) bore in the piston/cylinder assembly 65. The hammer 61 is restrained in a withdrawn position by a latch mechanism 97 when the piston 93 is extended and cocks the cam 85. The subsequent release of the latch mechanism 97 enables the hammer 61 to strike the wedge with the desired force. In this embodiment the piston has approximately 0.3 inches (0.76 cm) of travel.

Figure 7:
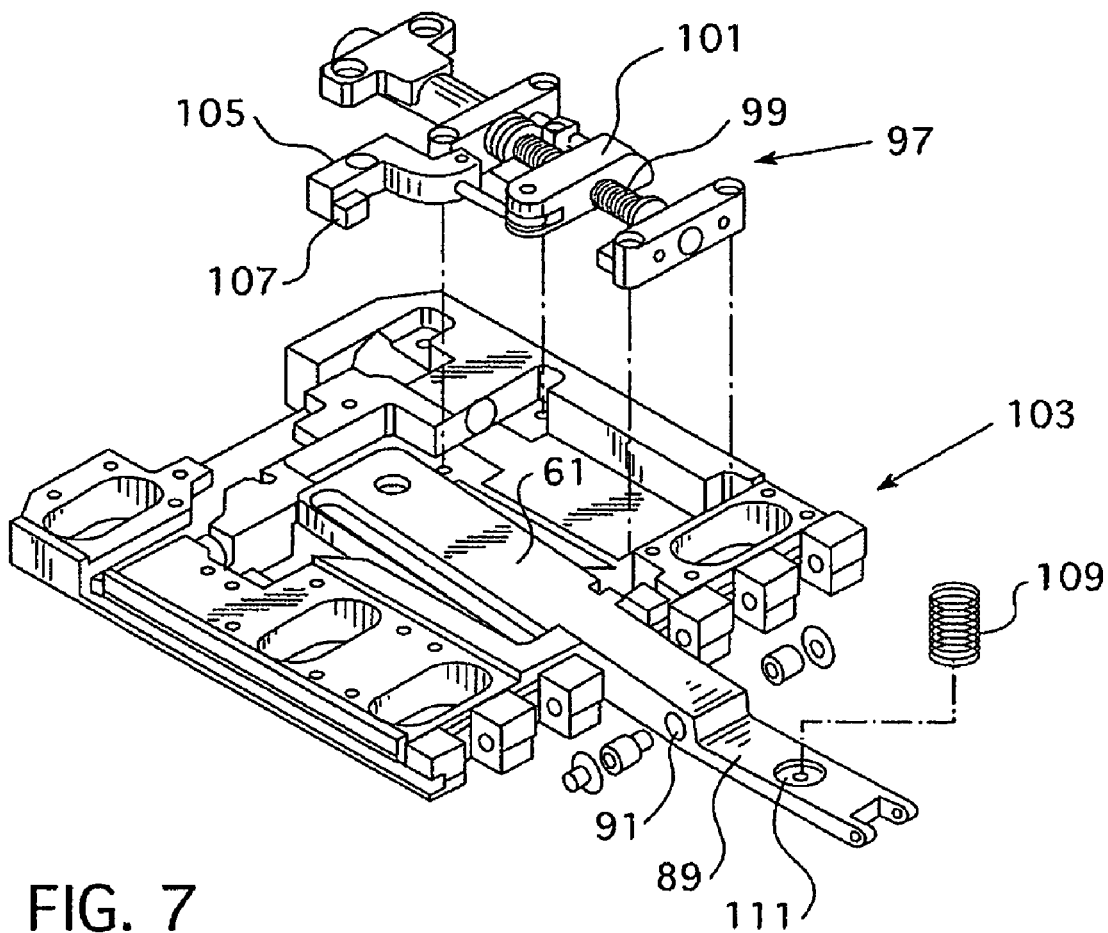
FIG. 7 is a perspective view of the front carriage of the low profile vehicle of this invention showing an exploded view of the hammer latch.

A better view of the latch mechanism 97 is shown in the exploded view in FIG. 7. The head of the hammer 61 is restrained from rotating into the page by a lip 107 on the latch 105 which seats under the head of the hammer 61 when the latch 105 is in the closed position. The latch 105 is connected to an electric motor 101 which drives the latch 105 back and forth axially on acme thread 99. A light spring 109 has one end seated in the groove 111 on the hammer handle 89 and is wedged between the groove 111 and the chassis cover 113 shown in FIG. 4. The spring 109 returns the hammer 61 and the piston 93 to a retracted position when the working fluid pressure is released from the piston assembly 65.

The operation of the effectuator can better be observed from FIGS. 5 and 6. Referring to FIG. 5 when the piston 93 is withdrawn within the piston/cylinder assembly 65 it moves the linkage 63 in a direction to the right of the page which causes the cam 85 to rotate about its pivot 95 in the counter-clockwise direction when the hammer 61 is not restrained by the latch 105. When the handle 89 under the influence of the spring 109 moves downward it retracts the head of the hammer 61 and moves the cam 85 in the counter-clockwise direction which causes the piston to retract when the pressure of the working fluid is released. As shown in FIG. 6, when the piston 93 is extended out of the piston/cylinder assembly 65 the linkage 63 moves to the left of the page rotating the cam 85 clockwise about its pivot 95 when the latch 105 is moved to the open position. The clockwise rotation of the cam 85 raises the peripheral end of the handle 89 causing the striking face of the hammer 61 to rotate downward about its pivot 91 causing the hammer to strike a wedge.

While the piston/cylinder assembly 65 may be either pneumatic or hydraulic, a high pressure pneumatic cylinder with a three-stage 0.31 inch (8 mm) piston was shown to propel the hammer 61 of the wedge tightness carriage 31 creating an impact force of between 300-400 psi (21.09-28.21 kg/cm$^2$) on the wedge of the generator stator slot. This arrangement replaces a high maintenance, larger motor driven, spring and cable system heretofore described that has a longer cycle time between impacts. The design of the effectuator 59 enables the profile of the vehicle 31 to be reduced in overall height from 0.75 inches (1.90 cm) to 0.56 inches (1.42 cm) and will decrease the inspection time.

By using high pressure pneumatics with compressed air as the working fluid, there are fewer mechanical components than with the existing motor driven spring and cable system. By eliminating these components, the maintenance required is reduced. The cable that connected the spring to the hammer on the existing system would typically fail at least once per inspection and sometimes two or three times, necessitating repairs that introduce costly delays. The high pressure pneumatics offers a faster cycle time between hammer strikes that is approximately four times faster. This faster cycle time should further reduce the time required for the total inspection. The smaller profile of the carriage will enable the inspection of smaller units that up to now could not be inspected without removing the rotor.

The high pressure pneumatics can use compressed air bottles or bottled nitrogen which can be delivered to the jobsite and fed either by pneumatic hoses that can extend through the tail 55 and couple to the inlet 71 of the pneumatic manifold 67 or stored in miniature gas bottles such as those used in the paintball industry that can be filled using a scuba compressor. The miniature bottles can be stored in the tail 55 under the tail cover 69. The miniature bottles are easily interchangeable and can be filed to 4,500 psi (316.38 kg/cm$^2$) on site. The high pressure pneumatics with a range of from 100 psi to 450 psi (7.03 to 31.64 kg/cm$^2$) or more preferably between 300 psi and 400 psi (21.09 and 28.12 kg/cm$^2$), can be regulated more closely, thus providing better data on benchmarks for releasing the hammer.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A remote-controlled dynamoelectric machine maintenance vehicle, comprising:

A frame;

At least one drive module attached to the frame and having a drive train that utilizes magnetic adhesion to traverse an interior ferromagnetic surface of the dynamoelectric machine;

A motor operatively connected to the drive module and responsive to a signal from a remote-controller, the motor providing a motive force to the drive train; and An effectuator attached to the frame that is driven by a multi-stage pneumatic or hydraulic piston and cylinder assembly wherein a pneumatic or hydraulic working fluid is supplied under pressure in parallel to each stage to activate the piston to drive an impact head to strike a wedge in a coil slot in a stator of a dynamoelectric machine; and Wherein the dynamoelectric machine maintenance vehicle is sized and configured to fit between the stator and a rotor of the dynamoelectric machine, wherein the frame has an elongated axial dimension and the piston travels parallel to the axis of the frame and the impact head strikes the wedge in a direction substantially orthogonal to the axis of the frame, wherein the impact head has a handle with a peripheral end and pivot spaced from the peripheral end and the peripheral end is connected to a first attachment point on a cam and the piston is connected to a second attachment point on the cam spaced from the first attachment point and the piston rotates the cam and drives the peripheral end in a direction that causes the impact head to strike the wedge when the piston is fully extended.

2. The remote-controlled dynamoelectric machine maintenance vehicle of claim 1 wherein the piston and cylinder assembly is a pneumatic assembly having a working gas delivered to the cylinder at between approximately 100 psi (7.03 kg/cm2) and 450 psi (31.64 kg/cm2).

3. The remote-controlled dynamoelectric machine maintenance vehicle of claim 2 wherein the piston and cylinder assembly is a pneumatic assembly having a working gas delivered to the cylinder at between approximately 300 psi (21.09 kg/cm2) and 400 psi (28.12 kg/cm2).

4. The remote-controlled dynamoelectric machine maintenance vehicle of claim 1 including a latch for restraining the impact head from striking the wedge when the piston is first activated.

5. The remote-controlled dynamoelectric machine maintenance vehicle of claim 4 wherein the latch is electrically operated.

6. The remote-controlled dynamoelectric machine maintenance vehicle of claim 1 wherein the dynamoelectric machine maintenance vehicle is sized and configured to fit between an air gap between the stator and rotor of the dynamoelectric machine that is approximately 0.56 in (1.42 cm).

7. The remote-controlled dynamoelectric machine maintenance vehicle of claim 1 wherein the multi-stage piston and cylinder assembly has three stages.

8. The remote-controlled dynamoelectric machine maintenance vehicle of claim 1 wherein the piston and cylinder assembly is a pneumatic assembly having a working gas supplied from miniature compressed gas bottle that are supported on the frame.

9. The remote-controlled dynamoelectric machine maintenance vehicle of claim 8 wherein the gas in the gas bottles are compressed to approximately 4500 psi (316.38 kg/cm2).

10. The remote-controlled dynamoelectric machine maintenance vehicle of claim 1 wherein the piston and cylinder assembly has an 0.31 in. (8 mm) bore diameter.

11. The remote-controlled dynamo electric machine maintenance vehicle of claim 1 wherein head develops an impact force of 300-400 psi (21.09-28.12 kg/cm2).

12. The remote-controlled dynamoelectric machine maintenance vehicle of claim 1 wherein the piston has 0.3 inches (0.76 cm) of travel.

* * * * *